(12) United States Patent
Shattuck

(10) Patent No.: US 9,845,825 B2
(45) Date of Patent: Dec. 19, 2017

(54) ROLLER BEARING WITH ENHANCED STRESS BEARING CAPACITY

(71) Applicant: NRB Bearings Ltd., Maharashtra (IN)

(72) Inventor: Charles Shattuck, Goshen, CT (US)

(73) Assignee: NRB Bearings Ltd., Maharashtra (IN)

( * ) Notice: Subject to any disclaimer, the term of this patent is extended or adjusted under 35 U.S.C. 154(b) by 0 days.

(21) Appl. No.: 15/031,113

(22) PCT Filed: Apr. 7, 2015

(86) PCT No.: PCT/IN2015/000165
§ 371 (c)(1),
(2) Date: Apr. 21, 2016

(87) PCT Pub. No.: WO2015/162623
PCT Pub. Date: Oct. 29, 2015

(65) Prior Publication Data
US 2016/0245335 A1 Aug. 25, 2016

(30) Foreign Application Priority Data
Apr. 8, 2014 (IN) ............................ 637/MUM/2014

(51) Int. Cl.
*F16C 23/08* (2006.01)
*F16C 19/26* (2006.01)
*F16C 33/58* (2006.01)

(52) U.S. Cl.
CPC .............. *F16C 23/08* (2013.01); *F16C 19/26* (2013.01); *F16C 33/585* (2013.01)

(58) Field of Classification Search
CPC ...... F16C 23/08; F16C 23/082; F16C 23/088; F16C 23/086; F16C 33/585; F16C 19/26
See application file for complete search history.

(56) References Cited

U.S. PATENT DOCUMENTS

| 3,294,413 | A | | 12/1966 | Jurosek |
| 3,307,891 | A | * | 3/1967 | Carullo ................. F16C 27/04 384/569 |
| 3,348,889 | A | | 10/1967 | Schaeffler et al. |
| 3,423,140 | A | | 1/1969 | Cowles |
| 3,447,848 | A | | 6/1969 | Pitner |
| 3,479,100 | A | | 11/1969 | Pitner |
| 3,572,860 | A | | 3/1971 | Hart |
| 3,601,457 | A | | 8/1971 | Helms |
| 3,740,108 | A | | 6/1973 | Fernlund |
| 3,844,631 | A | | 10/1974 | Otto |

(Continued)

FOREIGN PATENT DOCUMENTS

| DE | 2144173 | 3/1973 |
| DE | 4131694 A1 | 3/1983 |

(Continued)

*Primary Examiner* — Alan B Waits
(74) *Attorney, Agent, or Firm* — ColterJennings

(57) ABSTRACT

A roller bearing system comprising a rolling element having a cylindrical outer raceway; said rolling element is housed inside an outer ring to the bearing system; said outer ring having an inner and an outer diameter surface, is connected to a rotatable shaft from one end, said inner diameter surface of the outer ring having a non-symmetric convex shaped profiling facing the rolling element to facilitate maximum contact area during any operational condition.

19 Claims, 14 Drawing Sheets

(56) References Cited

U.S. PATENT DOCUMENTS

| | | | |
|---|---|---|---|
| 3,924,912 A | 12/1975 | Pitner | |
| 4,614,446 A | 9/1986 | Dreschmann | |
| 4,806,026 A | 2/1989 | Bauer et al. | |
| 4,995,734 A | 2/1991 | Schroeder | |
| 5,303,935 A | 4/1994 | Saksun | |
| 5,529,402 A * | 6/1996 | Murphy | F16C 19/46 384/564 |
| 5,618,116 A | 4/1997 | Ishikawa | |
| 5,803,621 A | 9/1998 | Assmann | |
| 5,902,022 A * | 5/1999 | Shattuck | F16C 19/26 384/569 |
| 6,050,571 A | 4/2000 | Rieder et al. | |
| 6,502,996 B2 | 1/2003 | Joki | |
| 6,644,860 B2 * | 11/2003 | Fuchida | F16C 19/466 384/569 |
| 6,832,971 B2 * | 12/2004 | Yamamoto | F16C 19/30 384/569 |
| 7,258,490 B2 | 8/2007 | Peschke et al. | |
| 7,841,774 B2 | 11/2010 | Thompson | |
| 8,157,451 B2 * | 4/2012 | Solfrank | F16C 19/46 384/457 |
| 9,080,602 B2 * | 7/2015 | Pausch | F16C 19/183 |
| 9,145,916 B2 * | 9/2015 | Fugel | F16C 19/30 |
| 9,447,821 B2 * | 9/2016 | Abrahamson | F16C 19/225 |
| 2001/0046337 A1 | 11/2001 | Backus et al. | |
| 2002/0110301 A1 * | 8/2002 | Niina | F16C 33/64 384/569 |
| 2005/0104302 A1 | 5/2005 | Matsui | |
| 2005/0252328 A1 * | 11/2005 | Shattuck | F16C 13/006 74/431 |
| 2007/0063451 A1 | 3/2007 | Yeager | |
| 2008/0131044 A1 | 6/2008 | Bauer et al. | |
| 2008/0267547 A1 | 10/2008 | Thompson | |
| 2009/0154854 A1 | 6/2009 | Akamatsu | |
| 2009/0220181 A1 | 9/2009 | Yamada | |

FOREIGN PATENT DOCUMENTS

| | | |
|---|---|---|
| DE | 9211702 U1 | 12/1992 |
| DE | 4131694 | 3/1993 |
| EP | 0074847 A1 | 3/1983 |
| FR | 2091152 A5 | 1/1972 |
| FR | 2173552 A5 | 10/1973 |
| GB | 803501 | 10/1958 |
| GB | 1252394 | 11/1971 |

* cited by examiner

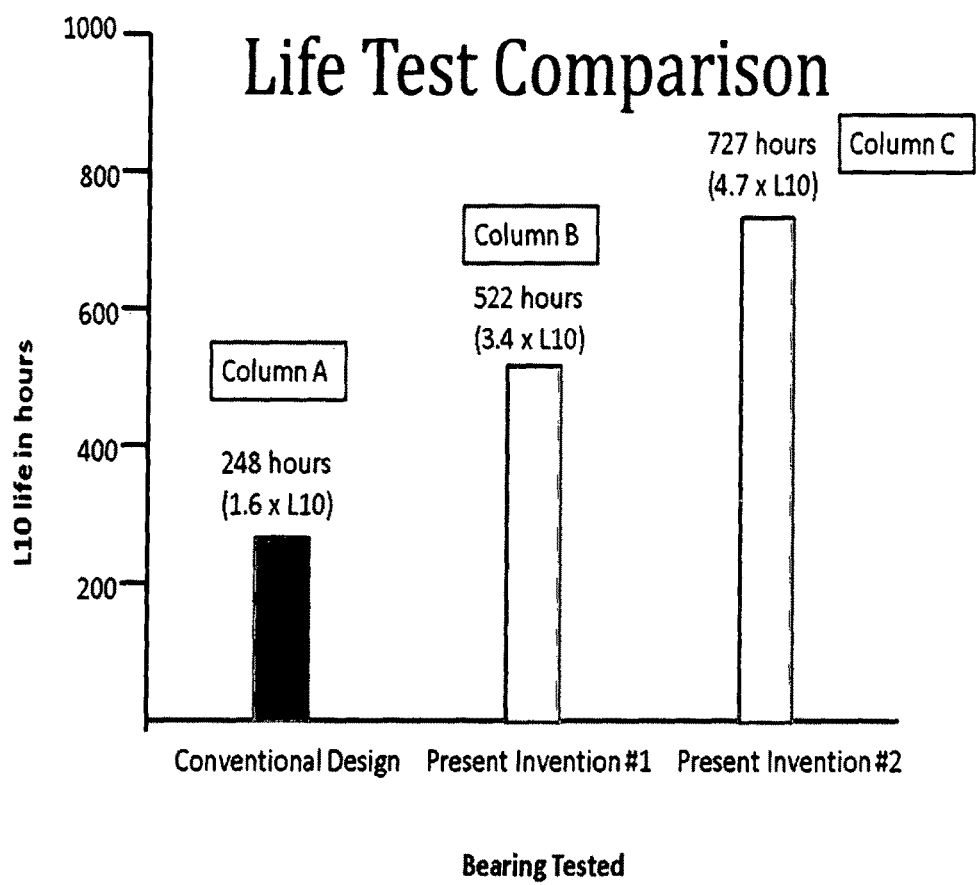
FIGURE :8

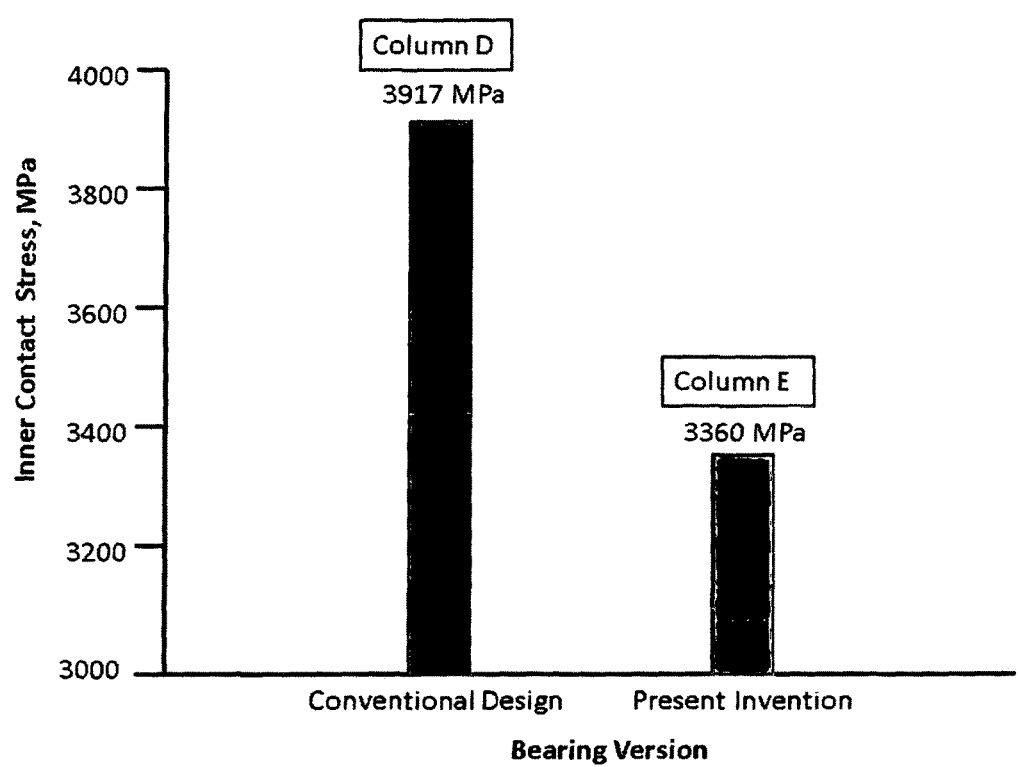
FIGURE :9

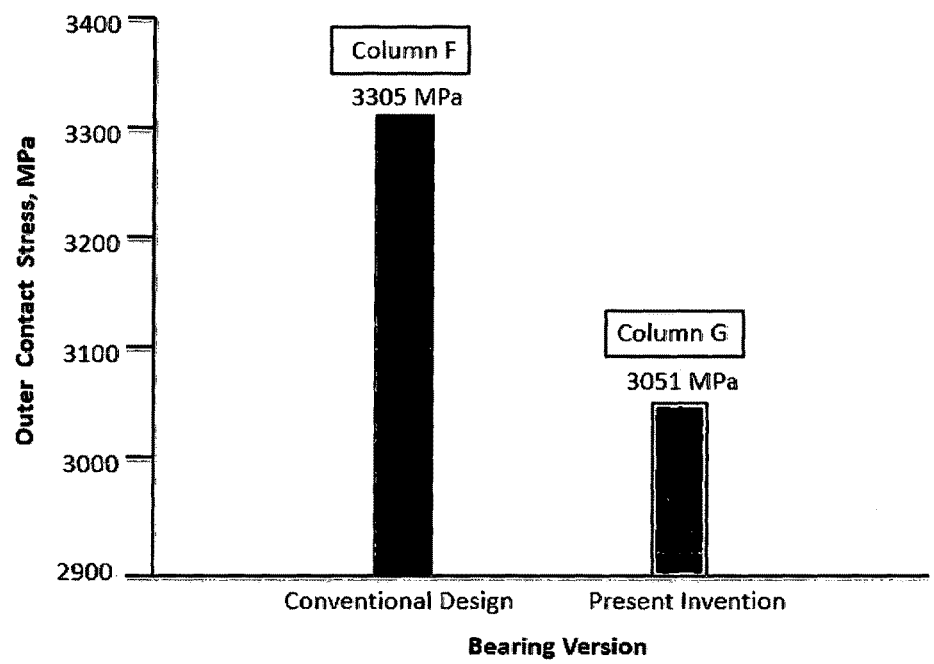
FIGURE: 10

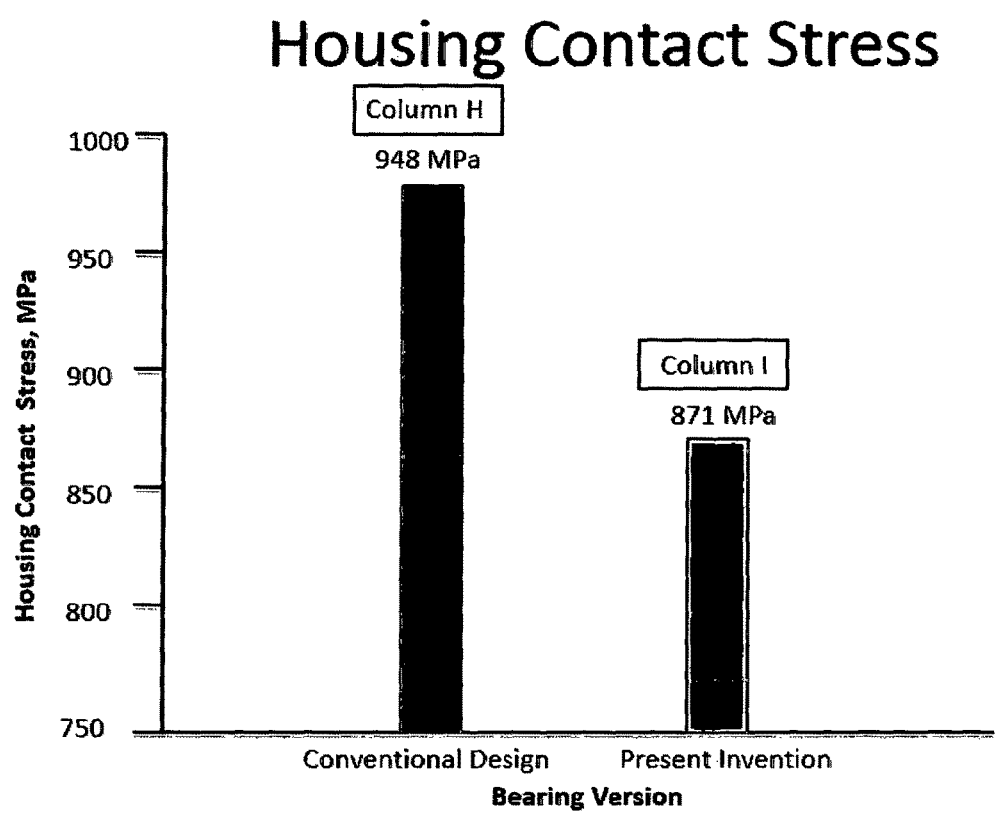
FIGURE: 11

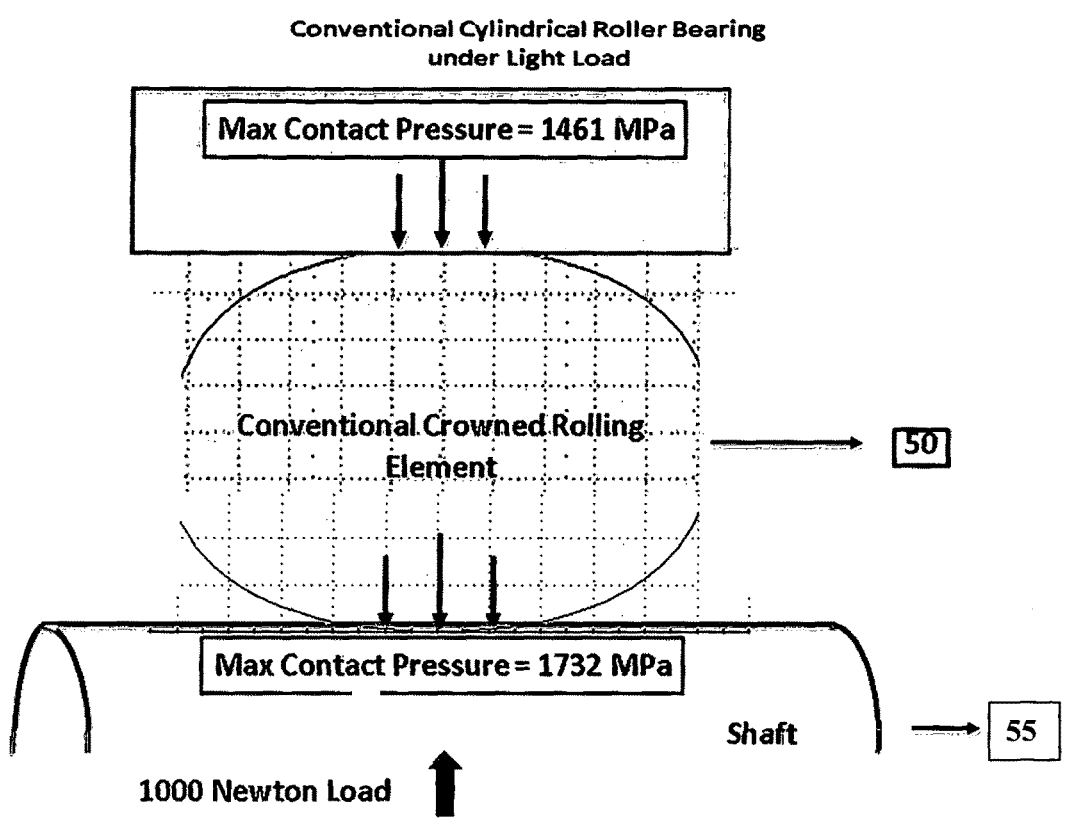
FIGURE: 12(A)

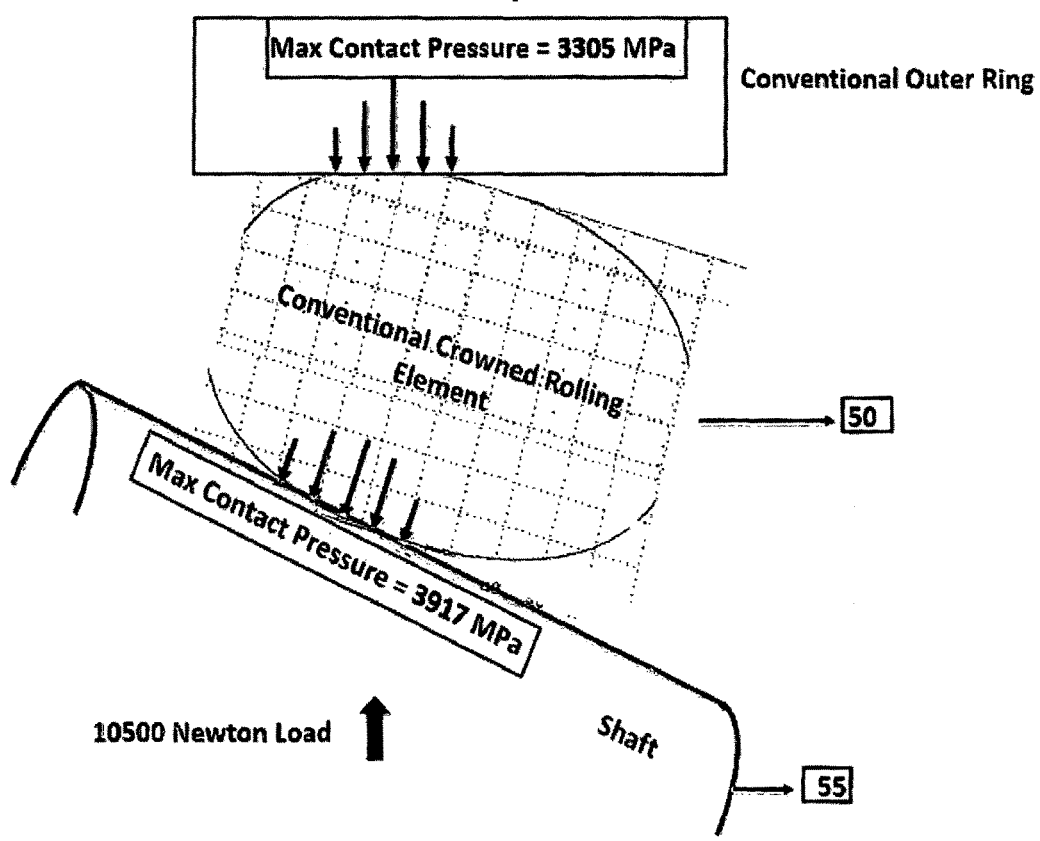
FIGURE: 12(B)

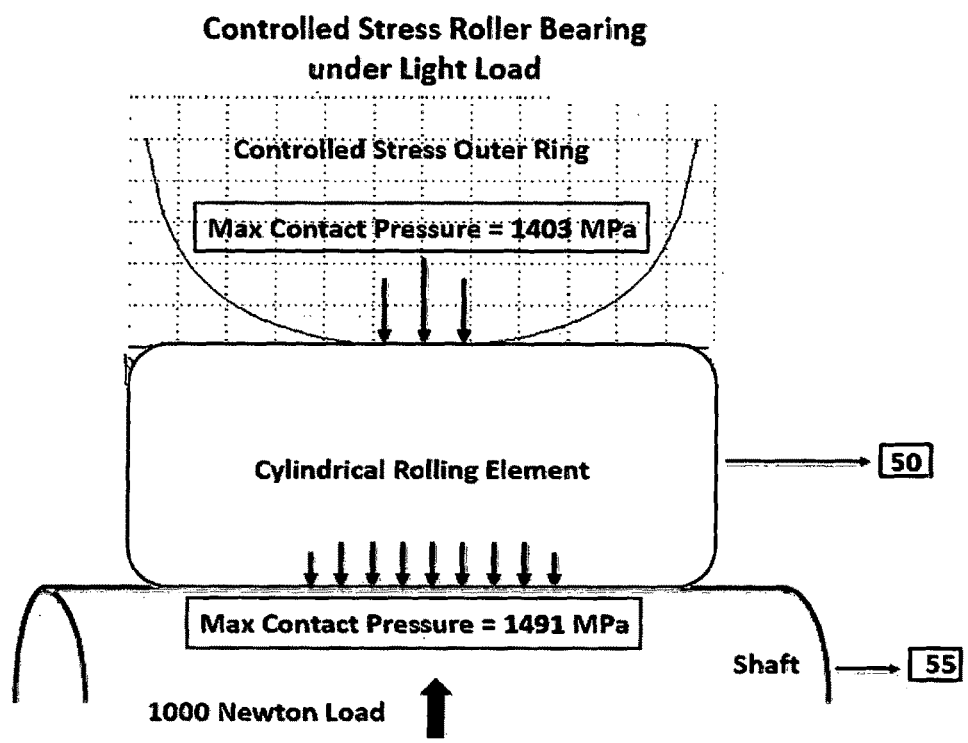
FIGURE: 12(C)

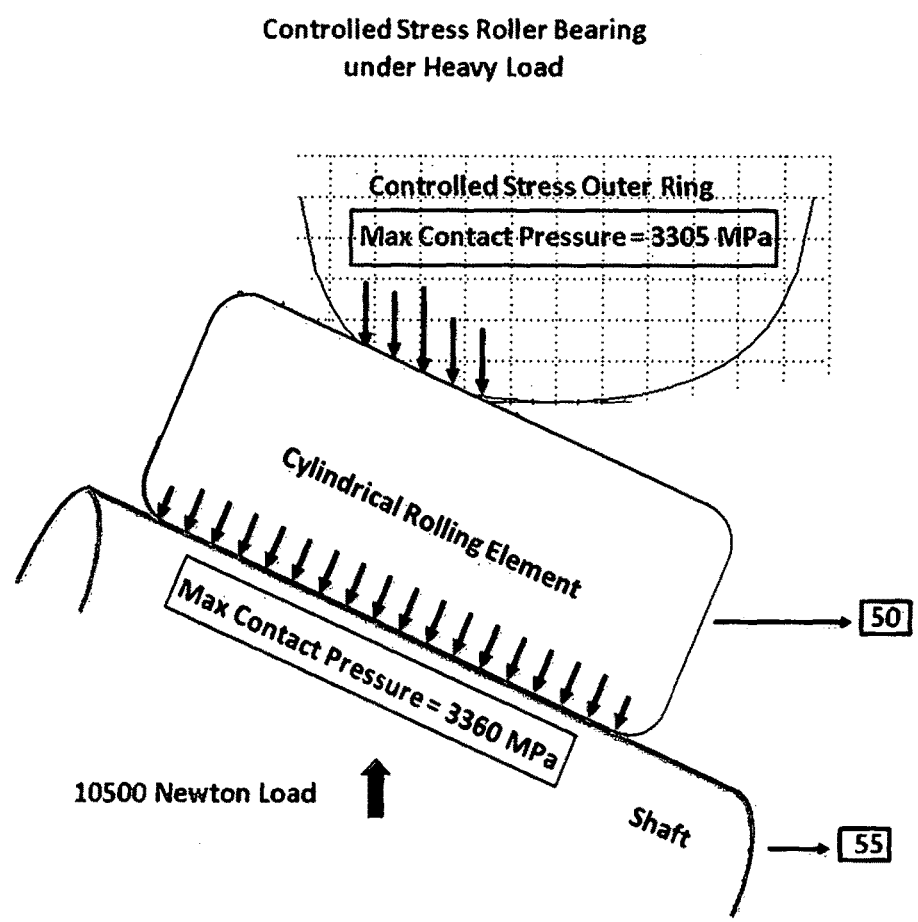
FIGURE: 12(D)

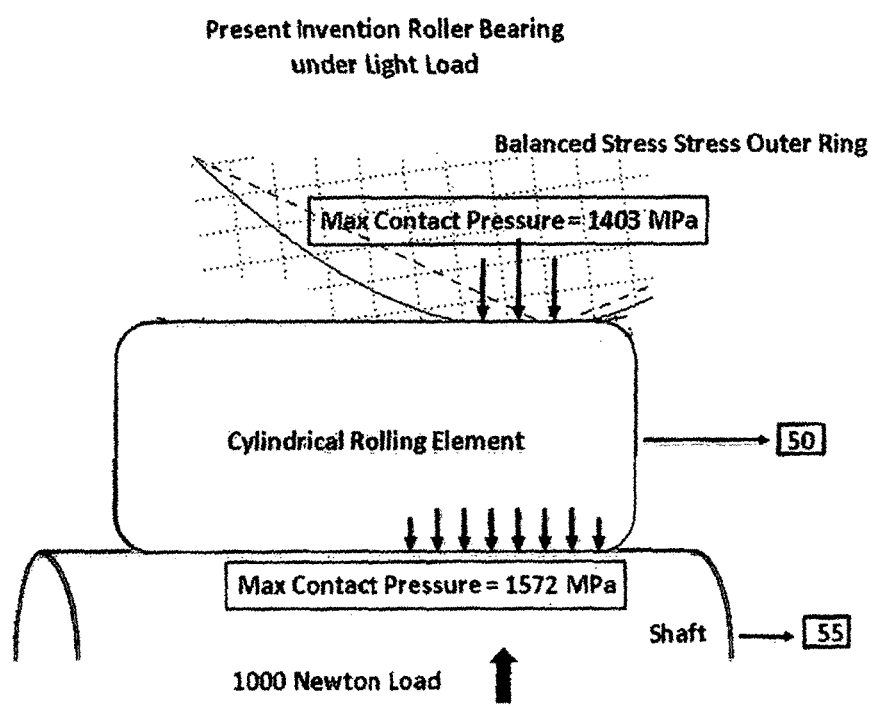
FIGURE: 12(E)

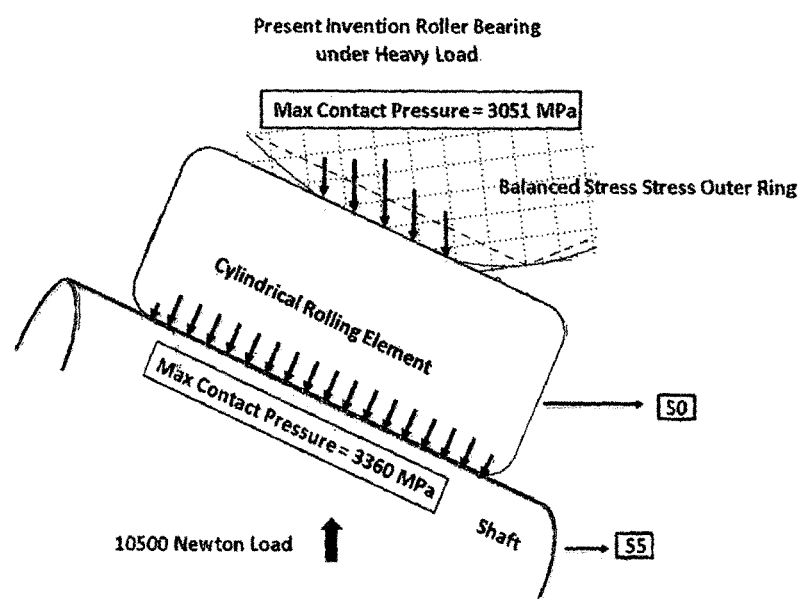
FIGURE: 12(F)

ROLLER BEARING WITH ENHANCED STRESS BEARING CAPACITY

FIELD OF THE INVENTION

The present invention relates to roller bearings. More particularly, the present invention discloses modified geometry of roller bearings to optimize the stress level and reduce wear and tear of the bearings.

BACKGROUND

Bearings are the devices, which facilitates relative motion (rotation) between two objects. In a typical construction, bearings are attached to a shaft through the bore and housing around its outer diameter. Bearings are designed to tolerate different loading conditions depending upon its type. Ball bearing and Roller bearing are the two most commonly used bearings in the engineering industry. Ball bearings are widely used for their simple design as they contain ball (spherical in shape) of various configuration as their rolling element. Roller bearings contain rollers, which are cylindrical shaped objects, as their rolling element. Roller bearings may contain rolling elements that have a large aspect ratio (length/diameter), small aspect ratio, spherical shape, or a tapered shape. The use of roller bearing has substantially increased in moderate and heavy duty applications, wherein the load bearing capacity is substantially high and it requires long durability as well as high efficiency.

The roller bearing plays a vital role in transferring the rotational force from one shaft to another. It acts as a connector, which facilitates the collinear motion of the shafts in all the planes. While in operation, due to the heavy loads and other application conditions, the probabilities of misalignment of shaft are very high. Due to such misalignment, the effective length of the contact area of the roller element gets reduced, which in turn creates stress on the roller element causing significant wear and tear. The misalignment can be either offset or angular, which can be checked and maintained by balancing the tolerance level of the rotating elements of the roller bearings. The wear and tear of a roller bearing includes cage deformation, roller bending or skewing and a wide range of surface defects. The latter include etching, coarse and fine grain spalling as well as brinelling. It is essential to check such wear and tear and to modify the existing geometry of the roller bearing to the extent that it can optimally reduce the stress on the contact surface of the roller bearing.

Conventional cylindrical roller bearing construction uses inner and outer racetracks that are essentially straight in profile. In order to allow for angular displacement between these racetracks due to misalignment and/or deflection due to loading, the rolling elements are profiled at their ends to reduce the contact stresses. Basically this tapering minimizes "pinching" of the rolling elements at their ends. While this solves the basic issue it does mean that the contact length between the rolling elements and the racetracks will always be shorter than the optimum for minimal contact stress and maximum bearing fatigue life.

With the advent of technology several attempts were made to modify/improve the geometrical construction of the bearings so as to make them more durable and efficient. One such prior art, discloses a controlled contact stress roller bearing. In the said prior art, rollers with cylindrical configuration without substantial end relief are positioned between the outer and inner raceways. The said rollers apply a contact force distributed over the outer raceway and inner raceway contact areas, resulting in an outer and inner raceway maximum contact stress, which determines respective outer raceway life and inner raceway life. The outer raceway has a crowned configuration such that a calculated maximum contact stress over the outer raceway contact area is controlled with respect to the maximum contact stress over the inner raceway contact area in order to make the outer raceway life substantially equal to the inner raceway life. However, the prior art does not teach the optimization in the geometrical construction of the roller bearing to reduce stress on the contact surface area under all operating conditions thereby increasing its life span.

Another prior art discloses a roller bearing with curved race track and roller profiles, whereby the radius of curvature is substantially bigger than the biggest distance between the center axes of the race tracks and their envelope surfaces, and having a cage for the rollers. Said cage is designed to permit required axial displacement of the rollers at tilting of the race tracks relative to each other. However, the same does not disclose the method to adjust the length of the roller depending upon the operating condition.

Yet another prior art discloses a roller bearing with specially constructed rollers. In the said prior art, the roller bearing have an outer and an inner race. The rollers between the races have a specifically constructed longitudinal external surface. The roller has varying diameters and varying radii of curvature along its length. The diameters are functions of the contact stress along the roller, the length of the roller, any contact angular misalignment of the roller axis in relation to the inner race axis, and the effective diameter of the bearing. The varying diameters are also such that within an acceptable error limit, a uniform contact stress is placed on each roller along the length of the roller. If desired, instead of the rollers, the inner race outside surface, or the outer race inside surface may be shaped to cause the uniform contact stress. However, the said prior art does not discloses the mechanism to enhance the stress bearing capacity without modifying the roller bearing.

To overcome the limitations discussed above and several others, the present invention discloses a roller bearing with modified geometry to optimize the stress level thereby increasing its durability and efficiency.

SUMMARY OF THE INVENTION

The present invention discloses a roller bearing system comprising a rolling element having a cylindrical outer raceway; said rolling element is housed inside an outer ring to the bearing system; said outer ring having an inner and an outer diameter surface, is connected to a rotatable shaft from one end, said inner diameter surface of the outer ring having a non-symmetrical convex shaped profiling facing the rolling element to facilitate maximum contact area during any operational condition. Various operations condition includes a minimum load condition, a medium load conditions and a maximum load condition.

In an embodiment of the present invention, the rolling element is a cylindrical roller or one which is somewhat tapered at its ends. Further, the length of the outer diameter over the cylindrical rolling element is at least three fourths of the axial length of the total cylindrical contact area.

In another embodiment of the present invention, the non-symmetrical convex shaped profiling includes a contour of projection and slope facing the rolling element to facilitate effective rotation of the rolling element inside the outer ring. Further, the geometry of convex shaped curve is such that at any operation condition or any degree of deflection in the shaft, the area of contact between the outer surface of the rolling element and the inner diameter surface of the outer ring remains the maximum.

The foregoing and other aspects will become apparent from the following detailed description of the invention when considered in conjunction with the accompanying drawing figures.

OBJECT OF THE INVENTION

It is therefore, the object of the present invention to design a roller bearing wherein the outer race profile is designed to reduce stress level under all operating conditions and therefore increasing the life span.

Yet another object of the present invention is to design a roller bearing wherein the transition between the extremes i.e. the stress level between the outer race and rolling element is adjusted gradually and automatically.

An object of the present invention is to design a roller bearing mechanism wherein the outer race profile can be customized for each bearing application thereby maximizing the bearing life.

BRIEF DESCRIPTION OF THE INVENTION

FIG. 1 discloses a prior art with light load conditions of a conventional cylindrical roller bearing system with profiled rolling elements.

FIG. 2 discloses a prior art with heavy load conditions of a conventional cylindrical roller bearing system with profiled rolling elements.

FIG. 3 discloses a prior art with light load conditions of a controlled stress roller bearing system with cylindrical roller elements.

FIG. 4 discloses a prior art with heavy load conditions of a controlled stress roller bearing system with cylindrical roller elements.

Figure 7:
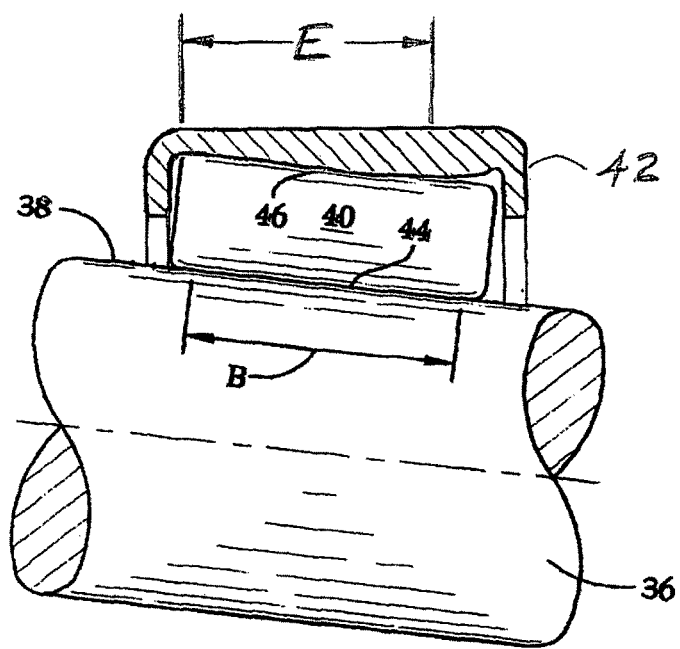

FIG. 7 discloses the maximum load condition of an embodiment of the present invention.

FIG. 8 of the present invention discloses a tabular representation comparing the bearing test life between the convention design and the present invention.

FIG. 9 discloses a tabular representation of stress level between the rolling element and the inner race of the bearing system of a conventional design and the present invention.

FIG. 10 discloses a tabular representation of outer race contact stress level of a conventional design and the present invention.

FIG. 11 discloses a tabular representation of the contact stress level at the interface between the housing and outer ring of a conventional design and the present invention when the rolling elements are heavily loaded.

FIGS. 12(A), 12(B), 12(C), 12(D), 12(E) and 12(F) discusses a comparative analysis of the construction of rolling element and its placement with the shaft in the prior art and the present invention.

DETAILED DESCRIPTION OF THE INVENTION

Figure 1:
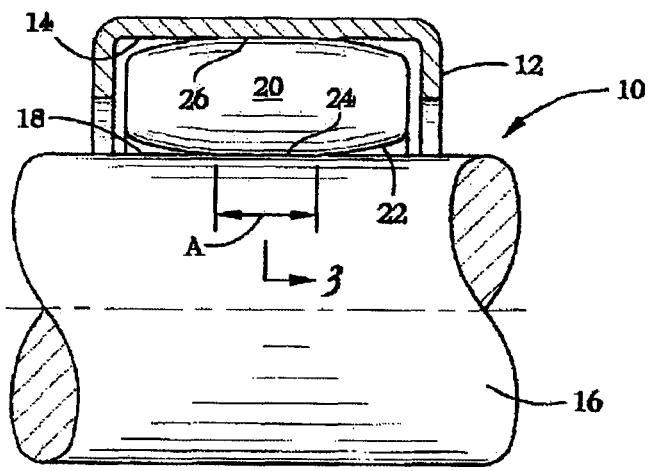
Figure 2:
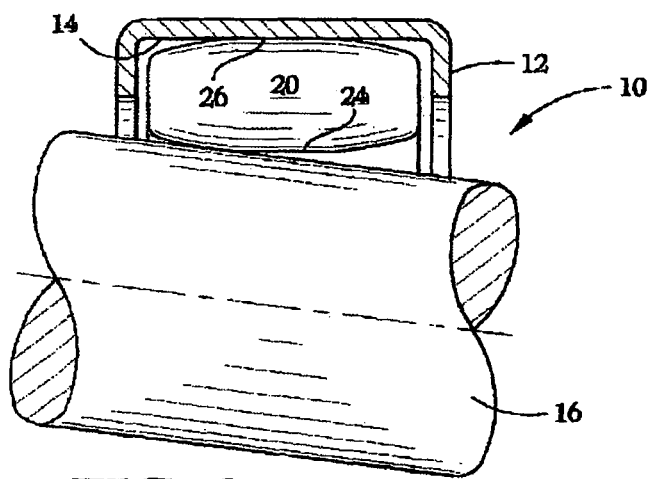

Reference is made to FIG. 1 and FIG. 2, which discusses an existing construction of a roller bearing as a prior art.

As depicted in the FIGS. 1 and 2, a conventional bearing system (10) is shown comprising a rolling element (20) housed inside an outer ring (12). The rolling element (20) is profiled from both the ends. The said rolling element (20) is sandwiched between the outer ring (12) and the shaft (16) such that the outer rolling surface (24) of the rolling element (20) rotates against the inner surface (18) of the shaft (16). Due to the profiled ends of the rolling element (20), there exist a gap (14) and (22) between the extreme ends of the rolling element (20) and the inner diameter of the external outer ring (12). The portion (26) and the area represented as "A" is the only contact area of the rolling element (20), which is in contact with the outer ring (12) and with the outer surface of the shaft (16) respectively.

Due to the heavy loads (as shown in FIG. 2) and other application condition, the rotating shaft (16), which the bearing system supports, tends to misalign. The profiled rollers (20) are required to allow this misalignment to occur without pinching at the ends causing excessively high contact stresses. The disadvantage of this configuration is that the effective length of the roller (length "A" as shown in the figure), which is in direct contact with the inner diameter of the shaft (16) is reduced at all times whereby the entire load is be carried by a short length (essentially "A" and portion marked as 26) of the rolling element (20) without being uniformly distributed all over the surface of the rolling element (20). Due to such misalignment the wear and tear of the bearing surface increases, this adversely affects the overall life of the bearing.

Figure 3:
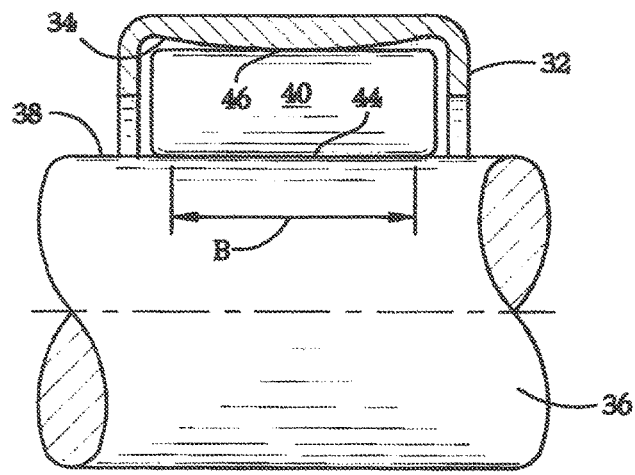
Figure 4:
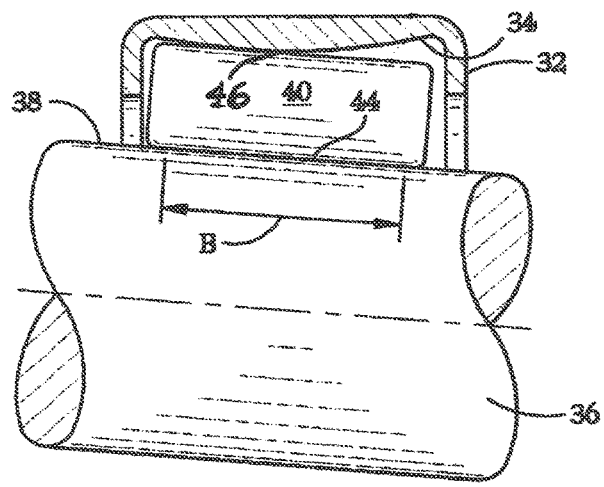

Further reference is made to FIG. 3 and FIG. 4, which typically discloses an advanced geometrical construction as compared to that discussed in FIG. 1 and FIG. 2. The present FIG. 3 and FIG. 4 discloses a controlled stress roller bearing with essentially cylindrical rolling elements under light load and heavy load conditions respectively.

As depicted in the earlier prior art, due to profiling of the roller element the contact area of the rolling element as well as the shaft reduces to a significant level, thereby decreasing the load bearing capacity of a bearing mechanism. The present prior art attempts to teach a modified geometry, wherein instead of profiling the rolling element, a symmetrical crowning is introduced at the inner diameter of the outer ring. Due to the symmetrical crowning, in all the operative conditions, the contact area between the rolling element and the shaft is maintained thereby reducing the wear and tear.

As depicted in FIG. 3 and FIG. 4, a bearing system comprising a cylindrical rolling element (40) housed inside an outer ring (32). The inner diameter of the outer ring (32) is profiled to have a symmetrical crowning (46) in the middle, which is aligned with the rotating surface of the rolling element (40). Due to the symmetrical crowning (46) on the inner diameter of the outer ring (32), there exist a gap (34) between the extreme ends of the outer ring (32) and the extreme ends of the rolling element (40). In the light weight condition (as shown in FIG. 3), the contact area between the rolling element (40) and the shaft is represented as "B".

However, in case of heavy load conditions (as illustrated in FIG. 4), the introduction of the symmetrical crowning (46) to the outer race to facilitates maintaining the contact area represented as "B" in case of any misalignment.

The prior art discussed above does not provide an effective mechanism to modify the geometrical construction of the roller bearing assembly, whereby with minimum modification the maximum contact area can be achieved. As discussed in the prior arts, the profiling of the rolling element or the symmetrical crowning of inner diameter of the outer ring creates a gap on the extreme ends which lead to a reduction in the overall load carrying ability. In order overcome the limitations discussed here and several others, the present invention is envisaged, which not only facilitates smooth rotation of the rolling element but also reduces the stress level thereby reducing the overall wear and tear.

Figure 5:
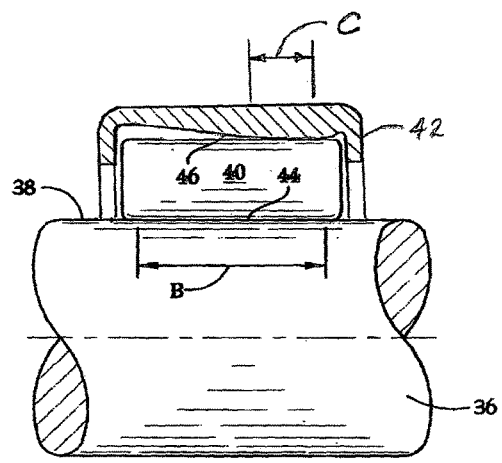
FIG. 5 depicts the minimum load condition of an embodiment of the present invention.
Figure 6:
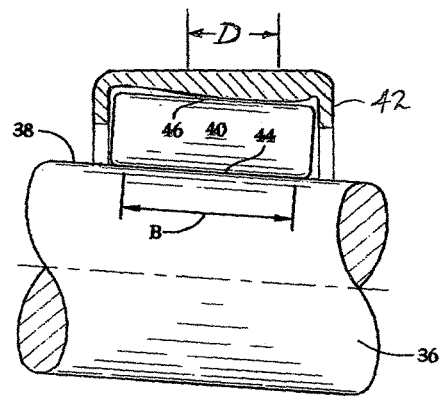
FIG. 6 represents a medium loading condition that is between the two extremes of an embodiment of the present invention.

Reference is made to FIGS. 5, 6 and 7, which represent the present invention along with the modified geometry of the bearing system. FIG. 5 depicts the minimum load condition whereas FIG. 7 deals with the maximum load condition and FIG. 6 represent a typical loading condition that is between the two extremes.

FIG. 5, FIG. 6 and FIG. 7 disclose various embodiments of the present condition. However, the same may not be construed as limitation of the present invention. The said bearing system have a cylindrical rolling element (40) housed inside the outer ring (42). The inner diameter (46) of the outer ring (42) is customized in such a way that the area of contact of the rolling element with the shaft (36) does not change with the degree deflection in the shaft during the maximum load condition. It is pertinent to mention herein that the contact surface area represented as "B" remains the same during the minimum as well as maximum load conditions. The sole purpose of this invention is to maximize bearing system life by optimizing the stress level between the rolling elements and inner diameter surface (46) of the outer ring (42) by adjusting the contact length for each of the applied loading conditions.

To accomplish the objective of maintaining the contact area, the inner diameter surface is profiled in such a way that a non-symmetrical convex surface always faces the rolling elements (40). Further, the magnitude and alignment of this convexity is customized in a way that at any degree of load and deflection of the shaft, area of the outer ring surface in contact with the rolling elements is appropriate to maximize the total bearing life.

FIG. 5 shows that at light load this contact length ("C" as marked in FIG. 5) is short, but this is acceptable since the contact stress levels are relatively low. As the load and shaft deflection increases the contact area on the outer race increases proportionately. This can be seen in FIG. 6 where the contact length (D as marked in FIG. 6) has increased substantially. The contact length reaches the maximum (E as marked in FIG. 7) under peak loading as shown in FIG. 7. This serves to minimize the stresses under this most severe loading condition which could otherwise cause considerable surface and subsurface damage to the rolling elements (40) and outer ring (42). The outer race profile can be customized for each bearing application.

Further, it is pertinent to note that the range of shaft deflections that the present invention can be customized for each specific application. In the present invention, strictly for an illustration purpose, the specific application in the development program calls for a shaft deflection range from zero to 2.2 milliradians, which is equivalent to a slope of 0.0022. Despite such a higher degree of deflection and slope, the present invention has successfully accomplished the same.

In another embodiment of the invention, the outer race crowning can be designed to be oriented in the application so as to minimize stresses under all operating conditions and therefore maximizing the life. Further, the customization of the outer race crown may vary depending upon the type of roller element used in the bearing system.

In yet another embodiment, as the load increases, the shaft misalignment also increases proportionately; thereby the bearing automatically adjusts itself to the available capacity to match the applied loads. This moves the portion of the outer race contacted by the rolling element incrementally to achieve a greater length of contact length to minimize the stress levels. In nutshell, the lightest applied loads will have the shortest outer race contact length whereas the heaviest loads have the longest contact lengths. The transition between these is extremely gradual and completely automatic. The disclosure so made in the various embodiments draws its supports from the various test data, which goes to show that with the introduction of convex profiling in the inner diameter of the outer ring, the life of the bearing system has increased to a significant level.

FIG. 8 of the present invention discloses a tabular representation comparing the bearing test life between the convention design and the present invention. The average life of a bearing is considered as 155 hours, whereas the prior arts, which were tested against the present invention, lasted for almost 248 hours (as shown in Column A) on given following "Test Conditions":

Test Conditions:
Radial load per bearing: 2500 Kg
Dynamic load rating of the bearing: 47200 N
Lubricant: BOT350M3
Bearing speed: 1250 RPM
Calculated L10 life: 155 hours While calculating the safety factor, the prior art was counted at 1.6 safety factor. The said safety factor is acceptable, but it does not give a large margin in the event that the specific application condition exceeds the expected norms or if the load ratings of the specific application are increased in future. In any event, if any, of the parameter varies, the prior art may fail to perform and cannot provide the expected results. The following tabular representation discloses the test results under the Test Conditions mentioned above for ease of reference:

| Type of Bearing | Average Life (L10 = 155) × Safety Factor | Life of Bearing (in Hours) |
| --- | --- | --- |
| Prior Art | 155 × 1.6 | 248 Hours (Column A) |
| Present Invention (Embodiment-1) | 155 × 3.4 | 522 Hours (Column B) |
| Present Invention (Embodiment-2) | 155 × 4.7 | 727 Hours (Column C) |

The above stated tabular representation shows that while undergoing the test under the same test conditions as prescribed for the prior art, the present invention has greatly exceeded the test lives of the conventional bearing. In a peculiar test the bearing life in the present invention has reached to 522 hours (as shown in Column B), which is almost 3.4 times of the average life of a bearing system. A further test of the present invention under similar test conditions, the bearing life reached 727 hours (as shown in Column C) which is 4.7 times the normal expected life for a conventional roller bearing. Thus, it is apparent from the date received after conducting the test that the performance of the present invention in different test conditions is far better than that of the prior arts.

FIG. 9 discloses a tabular representation of stress level between the rolling element and the inner race of the bearing system of a conventional design and the present invention.

The inner contact stress was measured for the conventional prior art and the present invention based on computer simulation of the application. The figures represented by Column D belongs to the inner race contact stress of the prior art, which was about 3917 MPa, whereas the value of inner race contact stress of the present invention was 3360

MPa represented by Column E. In realistic test conditions, the performance of the present invention has substantially gained.

FIG. 10 discloses a tabular representation of contact stress level between rolling element and outer race of a conventional design and the present invention.

The outer contact stress was measured for the conventional prior art and the present invention based on computer simulation of the application. The figures represented by Column F belongs to the outer race contact stress of the prior art, which was about 3305 MPa, whereas the value of outer race contact stress of the present invention was 3051 MPa represented by Column G. In realistic test conditions, the performance of the present invention has substantially gained. This is significant since the outer races in this type of bearing are typically not as robust as the inner races and the lower stress would be a great improvement in bearing life.

FIG. 11 discloses a tabular representation of contact stress level at the interface between the housing and the outer ring of a conventional design and the present invention when the rolling elements are heavily loaded.

The housing contact stress was measured for the conventional prior art and the present invention based on computer simulation of the application. The figures represented by Column H belongs to the housing contact stress of the prior art, which was about 948 MPa, whereas the value of housing contact stress of the present invention was 871 MPa represented by Column I. In realistic test conditions, the performance of the present invention has substantially gained.

Reference is made to FIGS. 12(A), 12(B), 12(C), 12(D), 12(E) and 12(F) which discusses a comparative analysis of the construction of rolling element (50) as well as its placement with regards to the shaft (55) in the prior art as well as the present invention. FIGS. 12(A) and 12(B) illustrate the construction in all the conventional cylindrical roller bearings under the light load condition and heavy load condition respectively. Similarly, FIGS. 12(C) and 12(D) illustrate the construction in all the controlled stress roller bearings under the light load condition and heavy load condition respectively.

As depicted in FIGS. 12(A) and 12(B), the conventional crowned rolling element (50) does not have the efficiency to reduce the pinching caused during load conditions. In the heavy load condition, as cited in the FIG. 12(B), the contact area between the rolling element (50) and the shaft (55) significantly reduces creating wear, and tear causing danger to the bearing life. In order to allow shaft deflection the rolling elements must have crowning to avoid pinching and high contact stresses. It can be seen that this conventional construction (in FIGS. 12(A) and 12(B)) produces a concentrated stress pattern between the rolling element and the shaft. This leads to early shaft failures.

In some of the prior arts, the conventional construction is improved by moving the crowning to the outer race and changing the roller profile to a basically cylindrical profile for most of its length as shown in FIGS. 12(C) and 12(D) of a prior art. This solves the problem of high stresses between the rolling element and the shaft, however, it does not address the contact stresses between the rolling element and the outer race. These basically remain the same as they would be with the conventional prior art.

As depicted in FIGS. 12(E) and 12(F), the present invention utilizes the non-crowned roller of a prior art. However it goes on to discuss the improvement in bearing life by expanding the contact area between the rolling element and the outer race. As depicted in the figures, the contact area between the outer race and the rolling element is directly proportionate to the degree of deflection in the shaft. This non-symmetric convex profile facilitates in increasing the contact area between the outer race and the rolling element thereby reducing the wear and tear. The present construction further enhances bearing life by reducing the contact stresses at that interface and making them more in line with the lower stresses on the shaft with the non-crowned rolling element. This greatly increases the bearing fatigue life and is designed to work automatically with the amount of shaft deflection under load. The table mentioned below explains the phenomenon based on the experimental data:

| Conventional Outer Ring (Prior Art) | | Controlled Stress Outer Ring (Prior Art) | | Balanced Stress Outer Ring (Present Invention) | |
|---|---|---|---|---|---|
| Maximum Contact Pressure in Light Load Condition under 1000 Newton Load 1461 MPa (FIG. 12-A) | Maximum Contact Pressure in Heavy Load Condition under 10500 Newton Load 3305 MPa (FIG. 12-B) | Maximum Contact Pressure in Light Load Condition under 1000 Newton Load 1403 MPa (FIG. 12-C) | Maximum Contact Pressure in Heavy Load Condition under 10500 Newton Load 3305 MPa (FIG. 12-D) | Maximum Contact Pressure in Light Load Condition under 1000 Newton Load 1403 MPa (FIG. 12-E) | Maximum Contact Pressure in Heavy Load Condition under 10500 Newton Load 3051 MPa (FIG. 12-F) |

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

I claim:

1. A roller bearing system comprising a cylindrical rolling element having an outer surface; said cylindrical rolling element is housed inside an outer ring to the bearing system; said outer ring having an inner and an outer diameter surface; said outer ring having a first end that is initially directly contacted by the cylindrical rolling element; said inner diameter surface of the outer ring having a non-symmetrical convex shaped profiling facing the outer surface of the cylindrical rolling element; said profiling being configured so that as the load on increases and causes the shaft deflection to increase, the contact between the outer surface of the cylindrical rolling element and the inner diameter surface of the outer ring moves in a direction away from the first end of the outer ring and the contact length between the outer surface of the cylindrical rolling element and the inner diameter surface of the outer ring progressively increases to facilitate maximum contact length.

2. A roller bearing system as claimed in claim 1, wherein the rolling element is a cylindrical roller and/or one which is tapered at its ends.

3. A roller bearing system as claimed in claim 1, wherein the length of the outer diameter over the cylindrical rolling element is at least three fourths of the axial length of the total cylindrical contact area.

4. A roller bearing system as claimed in claim 1, wherein the inner diameter of the outer ring is customized in such a way that the area of contact of the outer surface of the cylindrical rolling element with the shaft does not change with the degree of deflection in the shaft.

5. A roller bearing system as claimed in claim 1, wherein the non-symmetrical convex shaped profiling includes a contour of projection and slope facing the rolling element to facilitate effective rotation of the rolling element inside the outer ring.

6. A roller bearing system as claimed in claim 1, wherein the geometry of the non-symmetrical convex shaped profiling is such that the length of contact between the outer surface of the cylindrical rolling element and the inner diameter surface of the outer ring is directly proportional to the degree of deflection in the shaft.

7. A roller bearing system as claimed in claim 1, wherein various operational conditions include no load condition, minimum load condition, maximum load condition and overload condition.

8. A roller bearing apparatus comprising:
   a rolling element having a cylindrical outer surface, the rolling element housed inside an outer ring;
   the outer ring having an inner and an outer diameter surface, the outer ring having a first end that is initially directly contacted by the rolling element; and
   the inner diameter surface of the outer ring having a non-symmetrical convex shaped profiling facing the outer surface of the cylindrical rolling element, said profiling being configured so that as the load on increases and causes an increase in deflection of the shaft, the contact between the outer surface of the cylindrical rolling element and the inner diameter surface of the outer ring moves in a direction away from the first end of the outer ring and the contact length between the outer surface of the cylindrical rolling element and the inner diameter surface of the outer ring progressively increases.

9. A roller bearing apparatus as claimed in claim 8, wherein the rolling elements are cylindrical roller and/or one that is tapered at its ends.

10. A roller bearing apparatus as claimed in claim 8, wherein the length of the outer diameter over the cylindrical rolling element is at least three fourths of the axial length of the total cylindrical contact area.

11. A roller bearing apparatus as claimed in claim 8, wherein the inner diameter of the outer ring is customized in such a way that the area of contact of the outer surface of the cylindrical rolling element with the shaft does not change with the degree of deflection in the shaft.

12. A roller bearing apparatus as claimed in claim 8, wherein the non-symmetrical convex shaped profiling includes a contour of projection and slope facing the rolling elements to facilitate effective rotation of the rolling elements inside the outer ring.

13. A roller bearing apparatus as claimed in claim 8, wherein the geometry of the non-symmetrical convex shaped profiling is such that the length of contact between the outer surface of the cylindrical rolling elements and the inner diameter surface of the outer ring is directly proportional to the degree of deflection in the shaft.

14. A roller bearing apparatus comprising:
   a plurality of rolling elements each having a cylindrical outer surface, the rolling elements housed inside an outer ring;
   the outer ring having an inner and an outer diameter surface, the outer ring having a first end that is initially directly contacted by the rolling elements; and
   the inner diameter surface of the outer ring having a non-symmetrical convex shaped profiling facing the outer surface of the cylindrical rolling elements, said profiling being configured so that as the load on increases and causes an increase in deflection of the shaft, the contact between the outer surface of the cylindrical rolling elements and the inner diameter surface of the outer ring moves in a direction away from the first end of the outer ring and the contact length between the outer surface of the cylindrical rolling elements and the inner diameter surface of the outer ring progressively increases.

15. A roller bearing apparatus as claimed in claim 14, wherein the rolling elements are cylindrical roller and/or one that is tapered at its ends.

16. A roller bearing apparatus as claimed in claim 14, wherein the length of the outer diameter over the cylindrical rolling element is at least three fourths of the axial length of the total cylindrical contact area.

17. A roller bearing apparatus as claimed in claim 14, wherein the inner diameter of the outer ring is customized in such a way that the area of contact of the outer surface of the cylindrical rolling element with the shaft does not change with the degree of deflection in the shaft.

18. A roller bearing apparatus as claimed in claim 14, wherein the non-symmetrical convex shaped profiling includes a contour of projection and slope facing the rolling elements to facilitate effective rotation of the rolling elements inside the outer ring.

19. A roller bearing apparatus as claimed in claim 14, wherein the geometry of the non-symmetrical convex shaped profiling is such that the length of contact between the outer surface of the cylindrical rolling elements and the inner diameter surface of the outer ring is directly proportional to the degree of deflection in the shaft.

* * * * *